(12) United States Patent
Bhagavatula et al.

(10) Patent No.: US 8,654,958 B2
(45) Date of Patent: Feb. 18, 2014

(54) MANAGING CALL FORWARDING PROFILES

(75) Inventors: Girija Bhagavatula, Redmond, WA (US); Alexander W. Darrow, Seattle, WA (US); Arulkumar Elumalai, Lynnwood, WA (US); Scott A. Plette, Kirkland, WA (US); Eran Shtiegman, Redmond, WA (US); Sumit Garg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 418 days.

(21) Appl. No.: 12/789,879

(22) Filed: May 28, 2010

(65) Prior Publication Data

US 2011/0293084 A1    Dec. 1, 2011

(51) Int. Cl.
*H04M 3/42* (2006.01)

(52) U.S. Cl.
USPC ............. 379/211.02; 379/201.01; 379/201.02

(58) Field of Classification Search
USPC ............. 379/201.01, 211.02, 211.03, 211.04, 379/211.05, 212.01, 201.02, 207.02
See application file for complete search history.

(56) References Cited

U.S. PATENT DOCUMENTS

| | | | | |
|---|---|---|---|---|
| 6,891,942 B1* | 5/2005 | Porter et al. | ............. | 379/211.02 |
| 6,944,444 B1* | 9/2005 | Gillespie et al. | ............. | 455/417 |
| 7,664,491 B2 | 2/2010 | Vander Veen | | |
| 2005/0215242 A1 | 9/2005 | Black et al. | | |
| 2006/0072726 A1 | 4/2006 | Klein et al. | | |
| 2008/0043968 A1* | 2/2008 | Jain et al. | ................. | 379/211.02 |
| 2009/0141884 A1 | 6/2009 | Lyman | | |
| 2009/0154681 A1* | 6/2009 | Kung et al. | ............. | 379/211.02 |
| 2009/0156167 A1 | 6/2009 | Mooney | | |
| 2010/0080376 A1* | 4/2010 | Hartley et al. | ............. | 379/211.02 |

FOREIGN PATENT DOCUMENTS

| | | |
|---|---|---|
| KR | 1020010057370 A | 7/2001 |
| KR | 1020070023481 A | 2/2007 |
| KR | 1020070024306 A | 3/2007 |

OTHER PUBLICATIONS

"International Search Report", Mailed Date: Nov. 22, 2011, Application No. PCT/US2011/036884, Filed Date: May 17, 2011, pp. 10.
Arrington, Michael., "Skype Now Has Call Forwarding", Retrieved at << http://techcrunch.com/2005/08/31/skype-now-has-call-forwarding/ >>, Aug. 31, 2005, pp. 1.
Luther, Carol, "ATT Call Forwarding Instructions", Retrieved at << http://www.ehow.com/way_5876887_att-call-forwarding-instructions.html >>, Retrieved Date: Apr. 6, 2010, pp. 1-5.
"Business Phone Call Forwarding FAQ", Retrieved at << http://www.ringcentral.com/features/call-forwarding/faq.html >>, Retrieved Date: Apr. 6, 2010, pp. 1-4.
"FacetPhoneTM IP-PBX Telephone System", Retrieved at <<http://www.facetcorp.com/pdf/fp_feature_summary.pdf>>, Retrieved Date: Jan. 9, 2013, pp. 4.
"NOVOSEC AG SMARTFilter", Retrieved at <<http://www.novomobile.com/sfmanual.pdf>>, Retrieved Date: Jan. 9, 2013, pp. 1-14.

* cited by examiner

*Primary Examiner* — Khai N Nguyen
(74) *Attorney, Agent, or Firm* — Turk IP Law, LLC

(57) ABSTRACT

Call forwarding profiles corresponding to call forwarding settings based on time, location, and/or presence states of a called party are created. Different call forwarding settings are then activated based on corresponding predefined call forwarding profiles. Users are enabled to pre-configure their call forwarding profiles based on one or more rules.

20 Claims, 7 Drawing Sheets

MANAGING CALL FORWARDING PROFILES

BACKGROUND

Another aspect of constantly evolving, modern telecommunication technologies is the breadth of services. While the audio communication (phone) was the norm until recently, multimodal communications including text messaging, email, audio/video communication, data sharing, and many more are becoming a standard feature of widely available telecommunication services with a wide variety of devices accommodating those services. Enhanced communication systems such as Unified Communication (UC) systems are an illustrative example. Users of these systems are enabled to communicate with others via a variety of modalities and are provided a number of helpful ancillary services such as presence supplemented contact lists, access to scheduling and similar applications from the communication application user interface, and the like.

With the broad range of available communication modes, the decision making process for accepting, rejecting, or forwarding incoming communication session requests is also becoming more complicated. Users typically lack flexible options for managing incoming calls (e.g. forwarding, rejecting) in conventional Private Branch Exchange (PBX) phones. Quickly switching between multiple call forwarding options is not supported. Additionally, complex user forwarding preferences are difficult to implement in current call forwarding implementations. For example, call forwarding to a cellular phone during a vacation is simple to implement. However, configuring different call forwarding settings across multiple devices and multiple user preferences is challenging.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling creation of call forwarding profiles corresponding to call forwarding settings based on time, location, caller, and/or presence states of a called party and automatic activation of different call forwarding settings based on corresponding predefined call forwarding profiles. Users may be enabled to pre-configure their call forwarding profiles based on one or more rules.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
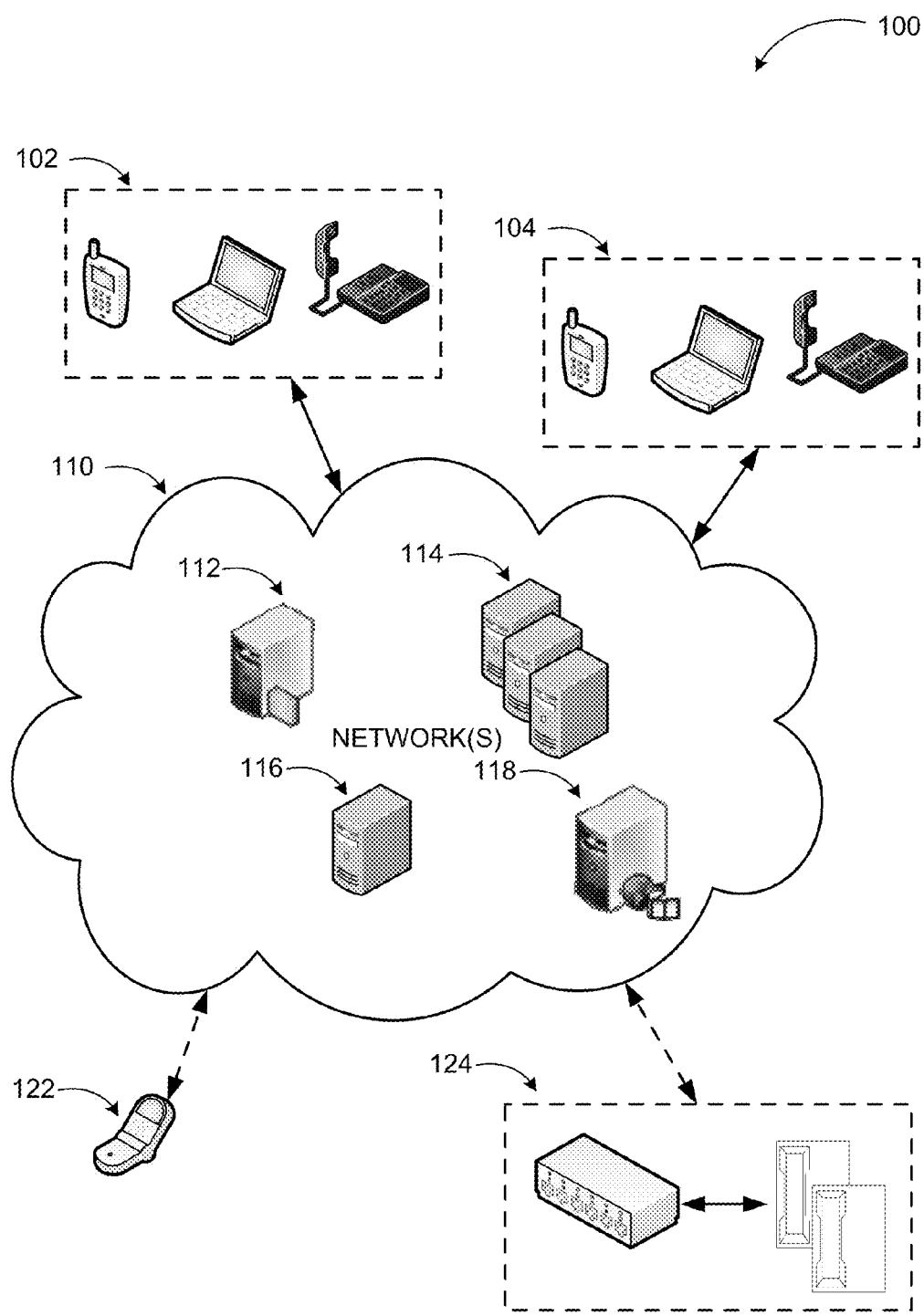
FIG. 1 is a diagram illustrating an example enhanced communication system, where embodiments may be implemented for managing call forwarding profiles.

As briefly described above, call forwarding profiles may be managed by pre-configuring multiple call forwarding rules to quickly switch between profiles and activate corresponding call forwarding settings in an automatic manner based on current user presence state and/or calling party details. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "server" generally refers to a computing device executing one or more software programs typically in a networked environment. However, a server may also be implemented as a virtual server (software programs) executed on one or more computing devices viewed as a server on the network. Similarly, a "client" may refer to a computing device enabling access to a communication system or an application executed on a computing device enabling a user to access a networked system such as a social networking service, an email exchange service, and comparable ones. More detail on these technologies and example operations is provided below.

Referring to FIG. 1, diagram 100 of an example enhanced communication system, where embodiments may be implemented for managing call forwarding profiles, is illustrated. Enhanced communication systems such as a unified communication system provide subscribers the ability to facilitate multi-modal communications. While such systems may integrate various aspects of multi-modal communications such as call forwarding profile management, subscribers may also participate in other systems such as social networking systems, other email systems, and similar ones. Thus, an enhanced communication system may provide a suitable platform for managing call forwarding profiles associated with a subscriber. A unified communication system is an example of modern communication systems with a wide range of capabilities and services that can be provided to subscribers. A unified communication system is a real-time communications system facilitating instant messaging, presence, audio-video conferencing, web conferencing functionality, and comparable capabilities.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality. Moreover, a subscriber of the UC system may use more than one end device and/or communication application for facilitating various modes of communication with other subscribers. End devices may also include various peripherals coupled to the end devices through wired or wireless means (e.g. USB connection, Bluetooth connection, etc.) to facilitate different aspects of the communication.

UC Network(s) 110 includes a number of servers performing different tasks. For example, UC servers 114 may provide registration, presence, and routing functionalities. Routing functionality enables the system to route calls intended for a user to anyone of the client devices assigned to the user based on default and/or user set policies. For example, if the user is not available through a regular phone, the call may be forwarded to the user's cellular phone, and if that is not answering a number of voicemail options or forwarding of the incoming call to one or more designated people may be utilized. Since the end devices may be capable of handling additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, presence servers providing presence functionality, home servers providing routing functionality, rights management servers, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method.

SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real-time Transport Protocol ("RTP").

Call forwarding profiles may be implemented by one or more servers of the UC system by routing in network and out-of-network conversations. The server may store one or more call forwarding rules for a user. The user may be enabled to define their profiles using the rules, which when activated enforce corresponding call forwarding settings. The profiles may be based on time, location, or presence states of a user. Thus, the server may monitor the presence status of the user including their location. After receiving an incoming call, the server may use a call forwarding setting defined in the user's call forwarding profile based on one or more of the above discussed parameters, and route the incoming call according to the applicable setting including simultaneous notification of multiple end points.

While the example system in FIG. 1 has been described with specific components such as mediation server, A/V server, and similar devices, embodiments are not limited to this system of the example components and configurations. An enhanced communication system facilitating multimodal call forwarding profile management may be implemented in other systems and configurations employing fewer or additional components. Furthermore, such systems do not have to be enhanced communication systems integrating various communication modes. Embodiments may also be implemented in systems facilitating different communication modes distinctly by coordinating implementation of the rules across different communication modes using the principles described herein.

Figure 2:
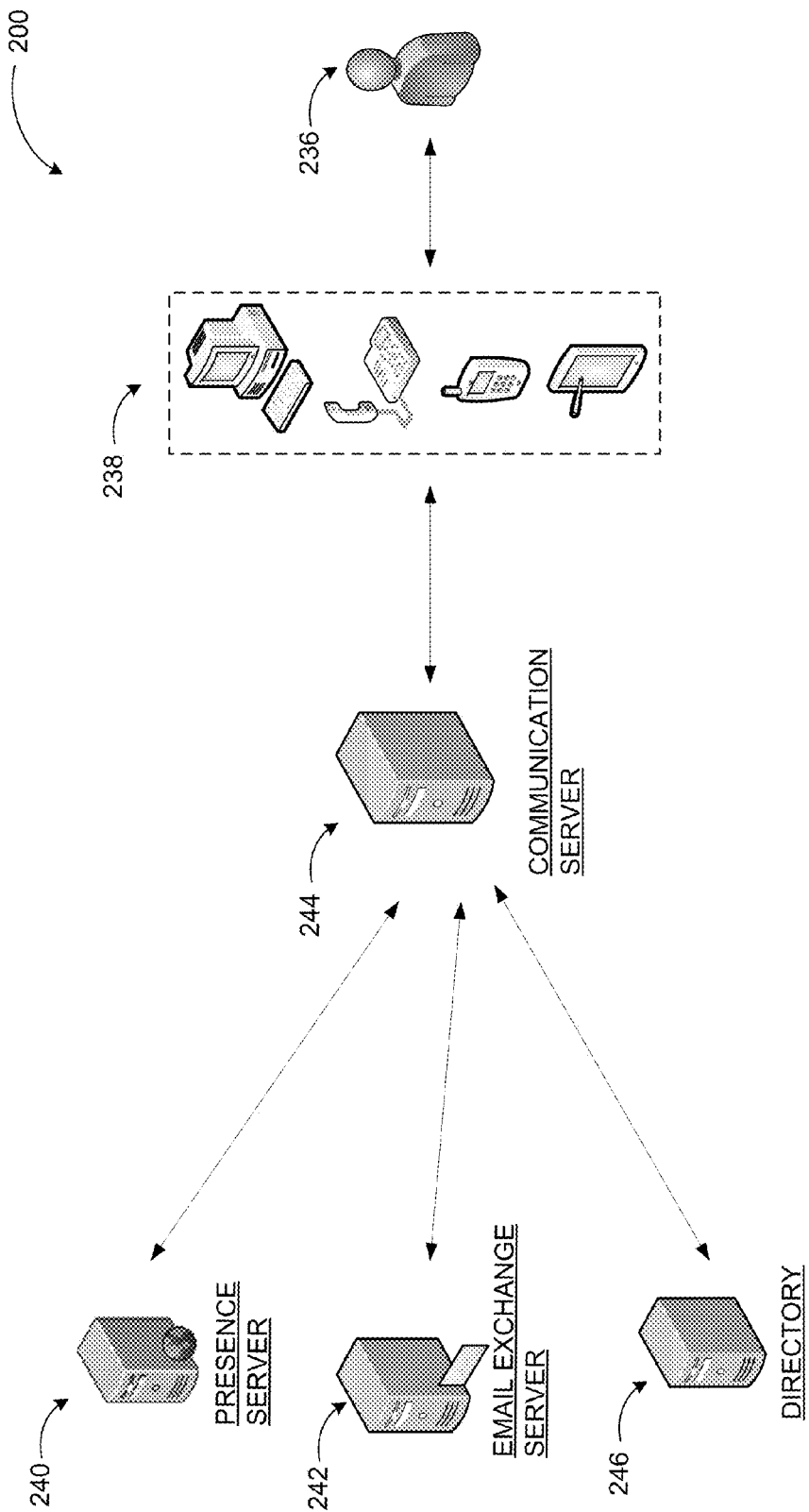
FIG. 2 is a conceptual diagram illustrating basic components of an example system for management of call forwarding profiles.

FIG. 2 includes conceptual diagram 200 illustrating basic components of an example system for management of call forwarding profiles. While a system according to embodiments is likely to include a number of servers and services such as those illustratively discussed in FIG. 1, only those relevant to embodiments are shown in FIG. 2.

User 236 may participate in an enhanced communication system through one or more end points 238. End points 238 may include stationary or portable computing devices capable of executing communication applications or dedicated communication devices such as smart phones. Communication server 244 may facilitate multi-modal communications for user 236. Communication server 244 may also provide ancillary services such as maintaining a presence-based contact list, voicemail services, and similar ones. In performing those tasks, communication server 244 may interact with servers (or services) within the enhanced communication system or external servers. Some of the example servers exchanging information with the communication server 244 may include presence server 240, email exchange server 242, directory server 246, and comparable ones.

In a system according to embodiments, user 236 may be enabled to set up call forwarding profiles based on one or more call forwarding rules with each rule having corresponding call forwarding settings. For example, user 236 may specify a call forwarding profile for work and another one for vacation. The first profile may include time and presence based rules such as "during work hours forward may calls to my assistant" and "when I am in a meeting forward my calls to my voicemail". Each of these rules has corresponding call forwarding settings: the first rule forwards incoming calls to another number, while the second rule forwards the calls to voicemail. A number of parameters may be used to define the rules including, but not limited to, the user's location, presence, time of day, day of week, caller's identity (if known or unknown), call type (modality), call context (associated with a project, personal, etc.), forwarding type (to a single destination, to multiple destinations), wait time before forwarding, and comparable ones.

The rules may range from simple ones as illustrated above to complicated cascade forwarding rules as discussed below in conjunction with FIG. 3. One or more rules may overlap or be enforced as exceptions to each other. Additionally, one or more profiles may also be applied at the same time. Some of the information for defining and implementing the profiles may be derived from the calls themselves (e.g. caller identity, context of the call, etc.). Other information may be received from sources like presence server 240 or email exchange server 242. Examples of those include user's presence indicating the user is in a meeting or the user's email/scheduling application indicating the user is on vacation. Yet other portions of the information may be inferred from user behavior. For example, activation of the user's desktop computer communication application may indicate the user is in his/her office and not busy (unless the user's presence state indicates otherwise).

Thus, the call forwarding profiles may determine how and to whom an incoming call is to be routed, how unanswered calls are to be handled, what timings are to be used in routing the calls, and what circumstances apply for each different setting. The "to whom" may include routing of the call to one or more parties designated by the user or by default rules, as well as one or more end points associated with a designated party. The user may be enabled to set up the call forwarding profiles by defining applicable rules for each profile answering the above listed questions. A user interface employing graphical, textual, color, and shading schemes for user friendly and streamlined interaction may be provided to the user to specify their profiles. Examples of such user interfaces are discussed below.

Once the profiles are completed, the user may activate them manually or they may be activated automatically by the communication server 244 based on monitoring above discussed parameters (time, presence, etc.). When a call is received, one or more applicable profiles may be checked and specified rules applied. This may implement corresponding call forwarding settings (e.g. forward to voicemail after 10 seconds).

Figure 3:
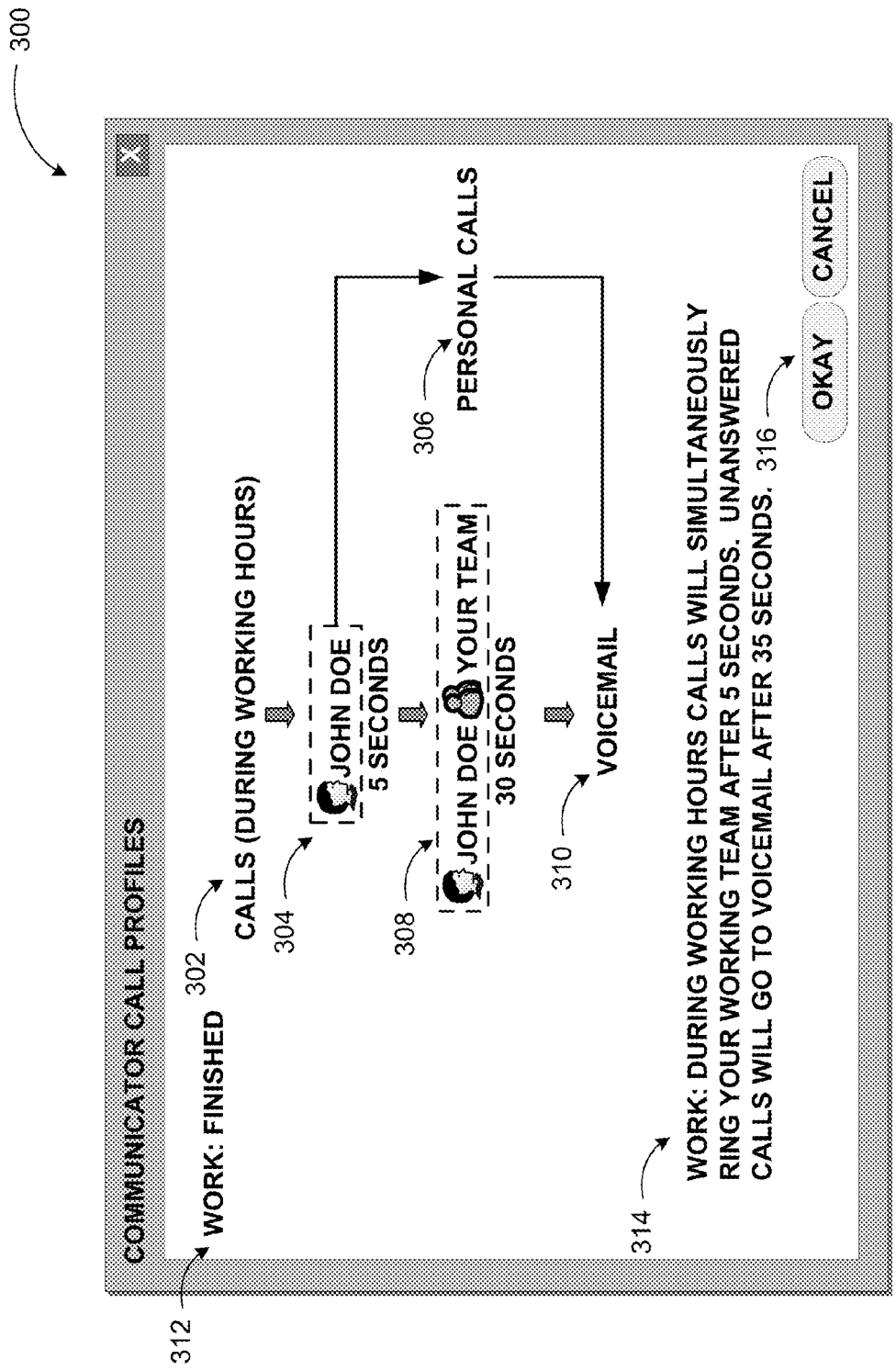
FIG. 3 illustrates example user interface displaying a call forwarding profile according to embodiments.

FIG. 3 illustrates diagram 300 of an example user interface displaying a call forwarding profile according to embodiments. Call forwarding profiles provides users with a framework to define their call forwarding settings for automatic implementation. Each profile may establish when the profile (and associated settings) is to be applied. This may be automatically determined from a scheduling application, presence application, or other resources indicating the user's status (e.g. at work, on vacation, in a meeting, away, etc.). The profiles may also specify how incoming calls are to be forked (e.g. forward to a single destination, simultaneous ring, cascaded forward defining multiple forks if a first attempt is unsuccessful). The destination(s) of forwarded calls may also be defined in the profiles (e.g. voicemail, other end points associated with the user, PSTN, contacts, contact groups, delegates, etc.).

Once the user has set up and configured one or more call forwarding profiles, the profiles may be activated by the user based on their circumstance or automatically activated by the system based on input from user's presence or scheduling information. Call forwarding profiles may be roamed across end points using the self-subscription presence model. A summary (aided by a graphical and/or color scheme) for the call forwarding profile may be provided to the user for visual confirmation of the call routing that is to be applied to the incoming calls once the profile is activated.

The described model provides the flexibility to allow multiple call forwarding profiles to be present in the system and to apply automatically specific call forwarding profiles based on factors like time or presence. The system may also be extended to have multiple profiles active at the same time. For example, a non-work hours profile may be active at the same time as presence status "In a Call". In this case, a pre-defined order may be implemented by which each profile is applied to the incoming call. Some of the time based options may be defined as mutually exclusive (i.e. they take the highest precedence and do not co-exists with other options).

A call forwarding profile associated with time based rules such as "Work-Hours" from a scheduling application may be automatically activated at the specified times. Hence, the user may be automatically switched between a work profile and an off-work profile based on their schedule in their scheduling application.

Similarly, a user may define a vacation profile, which may be associated with an out-of-office setting from the user's scheduling application. In this case, a corresponding "Vacation" profile may be automatically applied if the user sets their "Out-of-Office" message in their scheduling/email application. The call forwarding settings associated with the "Vacation" profile may be applied until the user comes back from vacation and resets the "Out-of-Office" status.

Other call forwarding profiles may include presence based rules. A user may define a call forwarding profile for the presence states such as "In a Call", "In a Meeting", "Busy", "Away", "Available", "Mobile", "Offline", and similar ones. The call profile associated with a specific presence state may be automatically activated when the user is in one of the possible presence states. This enables users to define different call forwarding settings for each presence status such as "Forward to My Delegate When My Presence Status Is In a Meeting".

Yet other profiles (or rules within profiles) may be based on the incoming call (e.g. call modality, caller identification, call context). Systems such as enhanced communication systems, which enable multi-modal communication along with additional services also provide metadata associated with calls beyond traditional information like caller id. For example, an incoming call may be classified as personal, business, associated with a particular project, or a similar category. Such information enables a user to decide how to handle the call, which in a system according to embodiments may include call forwarding settings. Following the same example, a call forwarding profile for "Vacation" may include a rule for calls received within work hours to be forwarded to an assistant (or team member). Yet another rule may specify that calls associated with a particular project are to be forwarded to a supervisor. The second rule may be automatically prioritized over the first one (because of its specificity) or manually prioritized and applied when the profile is activated.

The user interface in diagram 300 includes some of the basic elements of enabling a user to set up a call forwarding profile. The title 312 of the user interface displays the assigned name for the profile ("Work") and its status (e.g. being edited, finished, active, inactive, etc.). Next, a rule is displayed in a graphical flow. The rule is applicable to calls during work hours (302). As shown by the flow, calls during works hours will be forwarded to John Doe for five seconds (304). If the call is unanswered within five seconds, it will be forked to John Doe's team for 30 seconds (308), and if that second attempt is unanswered, the call will be delivered to voicemail 310.

The user interface includes a second flow illustrating a second rule. The second rule is for calls in the "personal call" category (306), which are directly forwarded to voicemail 310. The applicable rules are also presented in a textual form 314 at the bottom of the user interface. Controls for confirming or rejecting the profile (316) are included in the user interface as well. A user interface for setting up call forwarding profiles according to embodiments may include additional elements such as controls for defining timings, destinations, circumstances, etc. using selections (e.g. drop down menu) or direct input (e.g. text box). Further graphical elements such as icons may be used to indicate types of calls, categories of call forwarding destinations (e.g. person, team, voicemail), and comparable ones.

The above discussed scenarios, example systems, call forwarding profiles, or user interface elements are for illustration purposes. Embodiments are not restricted to those examples. Other forms of call forwarding rules, presentations, and user interface controls may be used in implementing the management of call forwarding profiles in a similar manner using the principles described herein.

Figure 4:
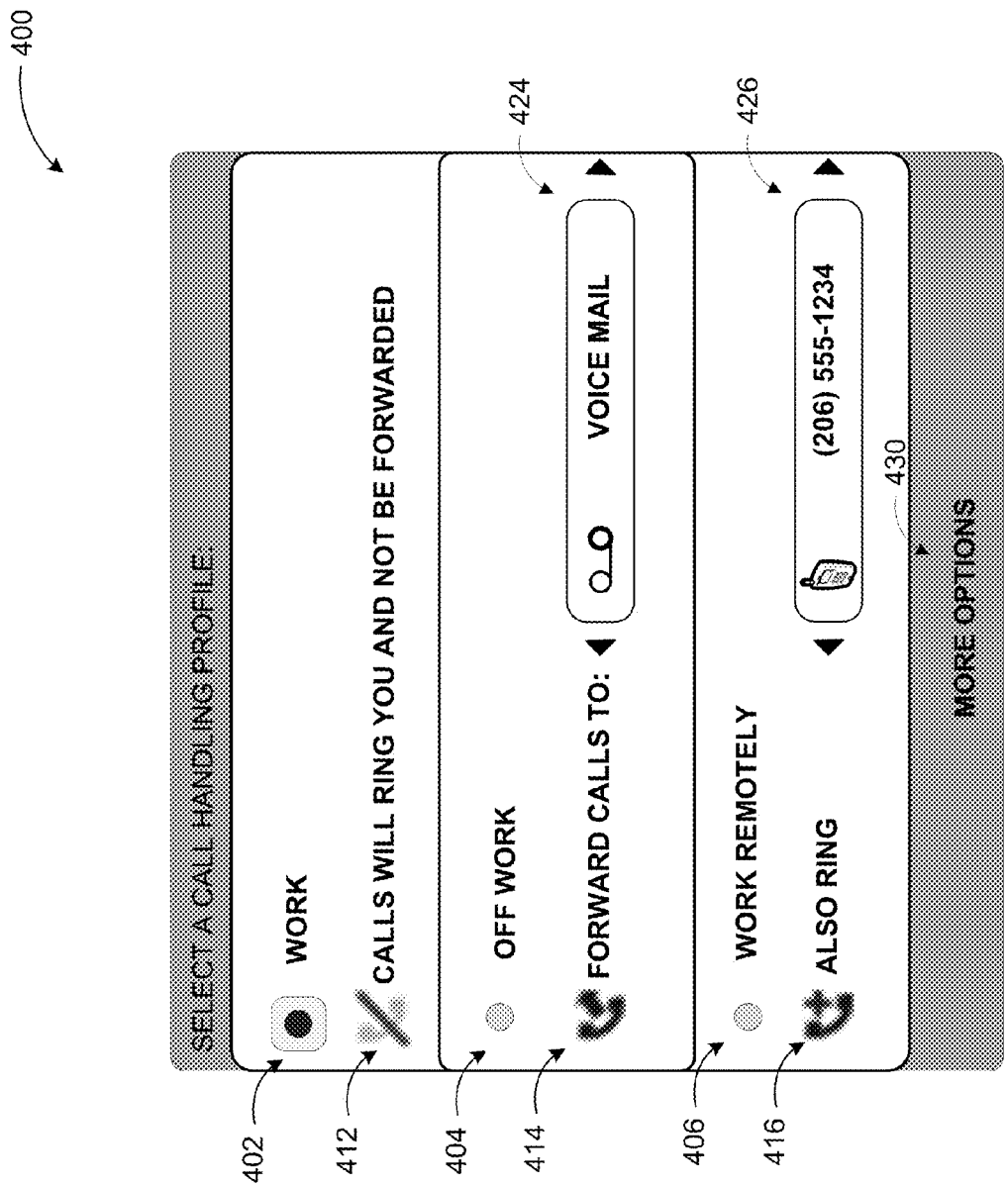
FIG. 4 illustrates another example user interface for defining call forwarding profiles according to embodiments.

FIG. 4 illustrates example user interface for defining call forwarding profiles according to embodiments. As illustrated in diagram 400, a user may select a call forwarding profile from a number of default profiles and be presented with options to customize the profiles. The underlying rules may be edited through graphical and/or textual user interface controls.

In the example user interface, first default profile 402 is "Work", which specifies the rule 412 that calls will be delivered to the user and not forwarded. The user may be enabled to click on the rule and change it to another. According to other embodiments, an administrator or system defined restrictions may be placed on the profiles. For example, employees of certain categories may not be allowed to modify "Work" profile, or only allowed to modify certain aspects of the profile (e.g. forward to destinations within the workplace only).

Second example profile 404 in the user interface specifies call forwarding rule 414 for "Off Work". For this particular profile, the rule is allowed to be modified. The user may select a destination 424 for forwarding the incoming calls such as voicemail. Third example rule 406 is "Work Remotely", which includes the call forwarding rule 416 "Also Ring". Rule 416 enables simultaneous ringing for incoming calls with a destination 426 for the simultaneous ring to be selected by the user (e.g. a team member's number). A control 430 for additional options to define, modify, or remove profiles may also be provided.

Figure 5:
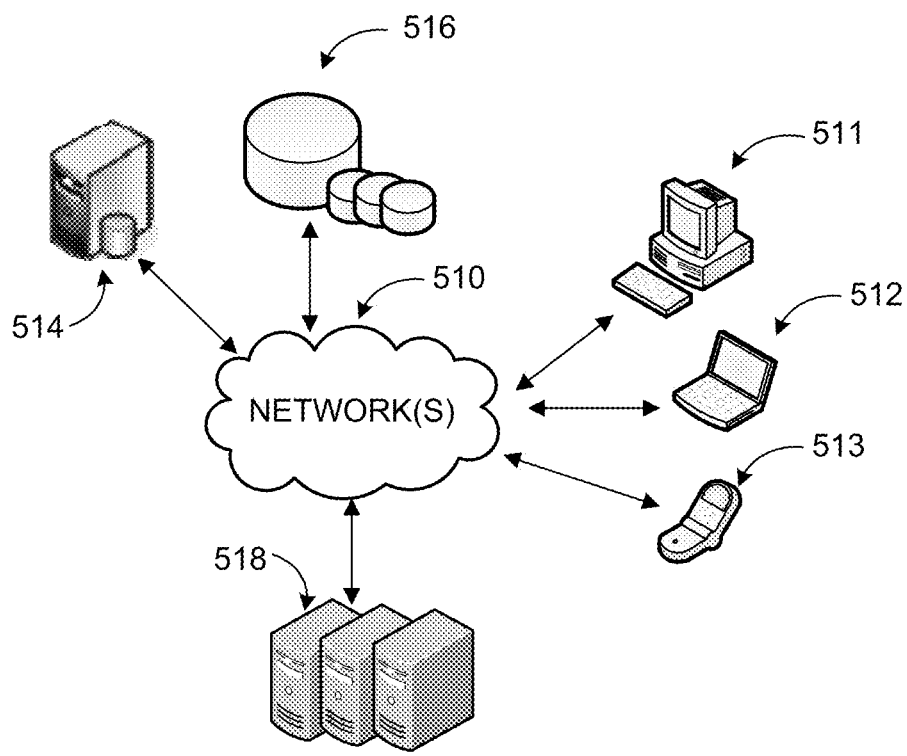
FIG. 5 is a networked environment, where a system according to embodiments may be implemented.

FIG. 5 is an example networked environment, where embodiments may be implemented. An enhanced communication system providing communication services including call forwarding profile management capability may be implemented via software executed over one or more servers 518 such as a hosted service. The system may facilitate communications between client applications on individual computing devices such as a smart phone 513, a laptop computer 512, and desktop computer 511 (client devices') through network(s) 510.

As discussed above, modern communication technologies such as UC services enable subscribers to utilize a wide range of computing device and application capabilities in conjunction with communication services. This means, a subscriber may use one or more devices (e.g. a regular phone, a smart phone, a computer, a smart automobile console, etc.) to facilitate communications and multiple communication services by pre-configuring multiple call forwarding rules to quickly switch between profiles and activate corresponding call forwarding settings.

Client devices 511-513 are used to facilitate communications through a variety of modes between subscribers of the communication system. One or more of the servers 518 may be used to enable users set up their call forwarding profiles and manage the same as discussed above. Call forwarding profile management information may be stored in one or more data stores (e.g. data store 516), which may be managed by any one of the servers 518 or by database server 514.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Network(s) 510 provides communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a communication system with call forwarding profile management. Furthermore, the networked environments discussed in FIG. 5 are for illustration purposes only. Embodiments are not limited to the example applications, modules, or processes.

Figure 6:
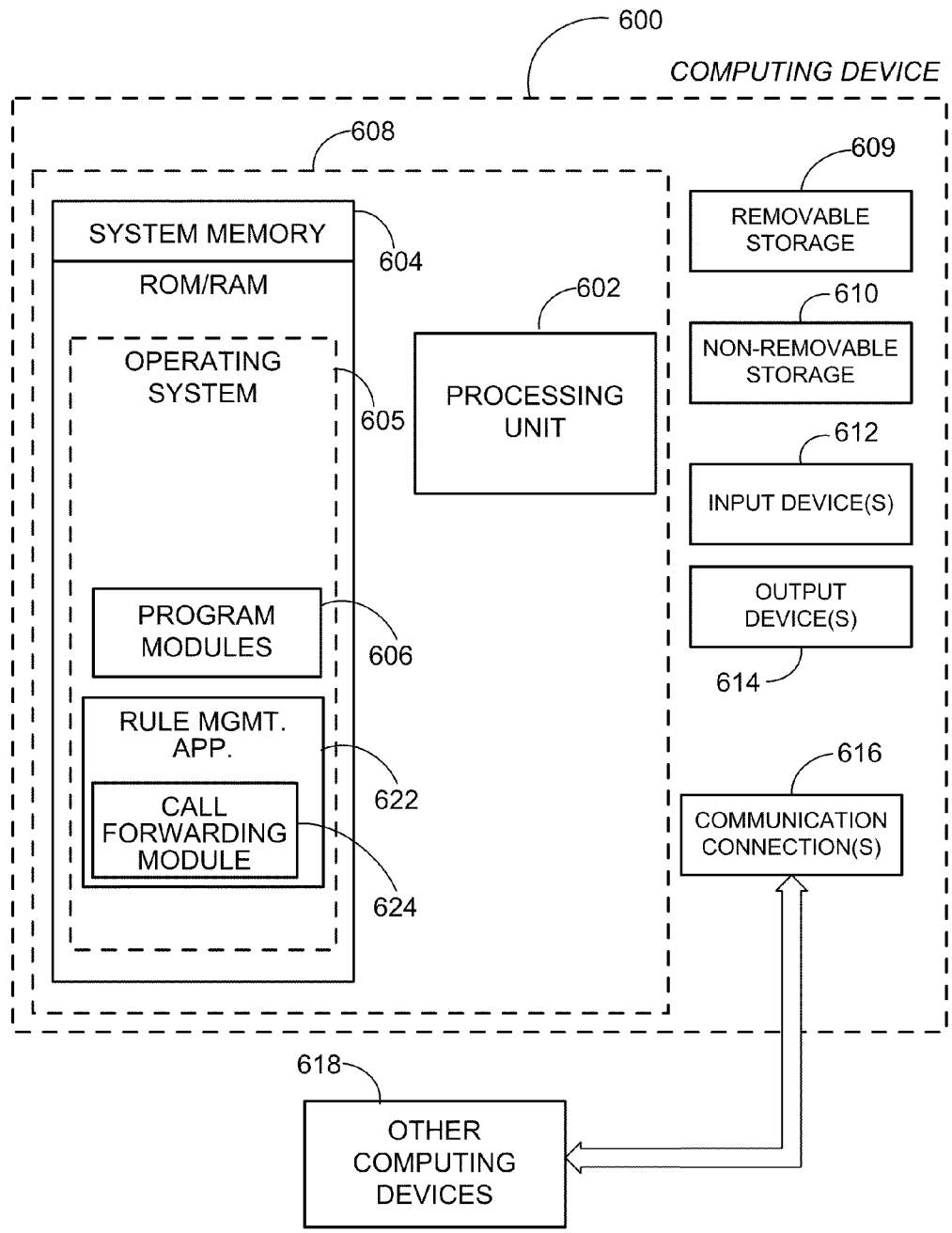
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a call forwarding profile management server as part of an enhanced communication system and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, communication application 622, and call forwarding module 624.

Communication application 622 may be part of a service that facilitates communication through various modalities between client applications, servers, and other devices. Call forwarding module 624 may forward incoming calls according to rules defined in one or more user call forwarding profiles. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, other directory or policy servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
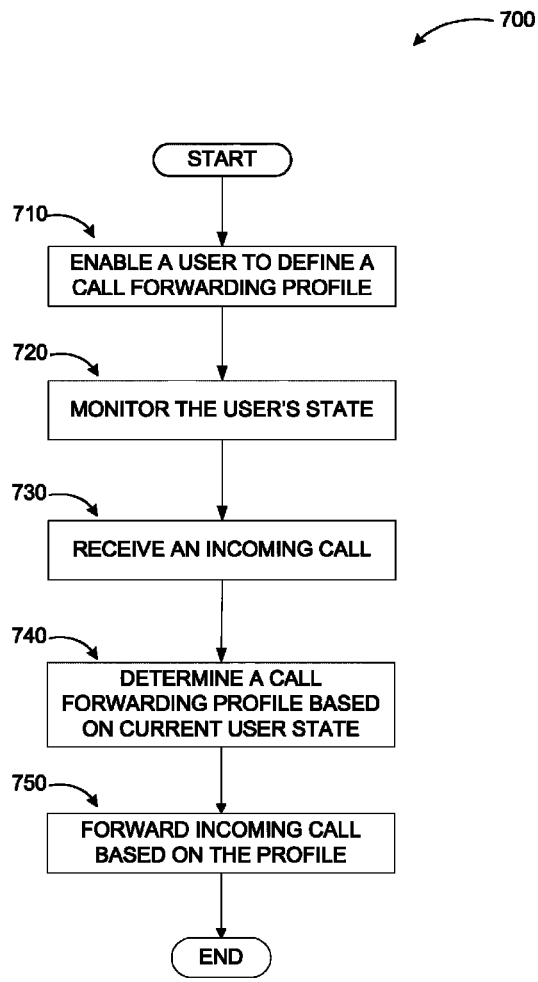
FIG. 7 illustrates a logic flow diagram for a process of managing call forwarding profiles in an enhanced communication system according to embodiments.

FIG. 7 illustrates a logic flow diagram of process 700 for managing call forwarding profiles according to embodiments. Process 700 may be implemented as part of an enhanced communication system that facilitates call forwarding.

Process 700 begins with operation 710, where a user is enabled to set up a call forwarding profile by defining one or more call forwarding rules, each rule corresponding to a call forwarding setting. As discussed previously, a user interface may be provided to enable the user select, input, remove, and modify parameters such as time, location, presence states on which a rule is to be based. The user interface may further allow the user to specify one or more destinations for the forwarded calls, alternatives (e.g. if the forwarded call bounces back), and comparable parameters using textual, graphic, color, shading, and similar presentation schemes.

At operation 720, the user's state is monitored by a server of the communication system. The user's state may include a time of day, day of week, a location of the user, and a presence of the user (available, busy, in a meeting, etc.). The user's state information may be obtained from a number of sources. Some information such as the presence may come directly from a server or may be inferred (e.g. the user having activated their mobile communication device may mean they are walking or driving as opposed to being in their office).

At operation 730, an incoming call intended for the user may be received by a communication server. The server may determine an applicable call forwarding profile based on a current state of the user at operation 740 and apply the rule(s) defined in the determined profile. As a result call forwarding settings to the applied rule(s) may be implemented at operation 750 forwarding the call to the designated destination(s).

The operations included in process 700 are for illustration purposes. A call forwarding profile management service according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device for managing a call forwarding profile, the computing device comprising:
   a memory;
   a call forwarding module;

a processor coupled to the memory and the call forwarding module, wherein the processor executes a communication application configured to:
enable a user to set up one or more call forwarding profiles, wherein each call forwarding profile includes at least one call forwarding rule corresponding to one or more call forwarding settings;
monitor a state of the user;
determine one or more applicable call forwarding profiles based on a current state of the user;
activate the one or more applicable call forwarding profiles automatically, wherein the one or more applicable call forwarding profiles are activated simultaneously;
receive an incoming call intended for the user;
use metadata information including a classification of at least one of: a personal call, a business call, and a project related call associated with the incoming call to prioritize the at least one call forwarding rule in the one or more activated call forwarding profiles;
forward the incoming call applying the at least one call forwarding rule prioritized in the one or more activated call forwarding profiles, wherein at least one of the activated call forwarding profiles are applied to the incoming call based on a pre-defined order.

2. The device of claim 1, wherein the at least one call forwarding rule is defined based on at least one from a set of: user location, user presence, time of day, day of week, caller identity, call context, call modality, routing type, and routing destination.

3. The device of claim 2, wherein the call context includes one of: a personal call, a business call, an emergency call, and a call associated with a project, and wherein the call modality includes one of: an audio call, a video call, an application sharing session, a data sharing session, a whiteboard sharing session, and a text message exchange.

4. The device of claim 2, wherein the routing type includes one of: a single forward, a cascaded forward, and a simultaneous ring, and wherein the routing destination includes one of: a person, a group, at least one end point associated with the user, and a voicemail.

5. The device of claim 1, wherein the state of the user includes at least one from a set of: a presence status of the user, a location of the user, a time of day, and a day of week.

6. The device of claim 1, wherein the application is further configured to:
determine the current state of the user based on one of: information from a presence application, information from a scheduling application, and an active end point associated with the user; and
activate the one or more applicable call forwarding profiles based on the current state of the user.

7. The device of claim 1, wherein the one or more applicable call forwarding profiles each include at least two call forwarding rules, and the call forwarding rules are prioritized based on one of: an automatic determination and a pre-defined order.

8. The device of claim 1, wherein enabling the user to set up one or more call forwarding profiles includes providing a user interface enabling the user to define call forwarding rules employing a graphical flow.

9. The device of claim 8, wherein the user interface enables the user to specify a circumstance, a routing destination, a routing type, a timing, and a call context for defining the call forwarding rules.

10. The device of claim 8, wherein the user interface includes at least one of a textual and a graphical summary of the defined call forwarding rules.

11. The device of claim 1, wherein the presence state is one of: busy, in a meeting, on a vacation, available in, mobile, offline, in a call, and away.

12. A communication system for providing multi-modal communication service with call forwarding profile management, the system comprising:
a communication server configured to:
enable a user to set up one or more call forwarding profiles through a user interface employing a graphical flow, wherein each call forwarding profile includes at least one call forwarding rule corresponding to one or more call forwarding settings;
determine a current state of the user based on one of: information from a presence application, information from a scheduling application, and an active end point associated with the user;
determine one or more applicable call forwarding profiles based on the current state of the user;
activate the one or more applicable call forwarding profiles automatically, wherein the one or more applicable call forwarding profiles are activated simultaneously;
enforce the one or more call forwarding settings corresponding to the at least one call forwarding rule upon activation of the one or more applicable call forwarding profiles;
receive an incoming call intended for the user;
forward the incoming call applying the at least one call forwarding rule in the one or more activated call forwarding profiles, wherein at least one of the activated call forwarding profiles are applied to the incoming call based on a pre-defined order; and
forward the incoming call to a fork associated with a next call forwarding rule in the one or more applied call forwarding profiles upon an unanswered attempt associated with a previous call forwarding rule.

13. The system of claim 12, further comprising:
a presence server configured to provide presence information associated with the user for the communication server to determine the current state of the user.

14. The system of claim 12, further comprising:
an email exchange server configured to provide scheduling information associated with the user for the communication server to determine the current state of the user and to automatically activate the one or more applicable call forwarding profiles.

15. The system of claim 12, wherein the user interface employs at least one from a set of: a textual scheme, a graphical scheme, a color scheme, and a shading scheme to present the call forwarding rule.

16. The system of claim 12, wherein the user interface is configured to present at least one default call forwarding profile, and enable the user to modify at least one call forwarding rule associated with the default call forwarding profile.

17. The system of claim 16, wherein modification of at least one of the default call forwarding profiles presented by the user interface is restricted based on system rules.

18. A computing device for managing a call forwarding profile, the computing device comprising:
a memory;
a call forwarding module;

a processor coupled to the memory and the call forwarding module, wherein the processor executes a communication application configured to:
provide a graphical user interface for enabling a user to set up at one or more call forwarding profiles, wherein each call forwarding profile includes at least one call forwarding rule corresponding to one or more call forwarding settings;
determine a current state of the user based on one of: information from a presence application, information from a scheduling application, and an active end point associated with the user;
determine one or more applicable call forwarding profiles based on the current state of the user;
activate the one or more applicable call forwarding profiles automatically, wherein the one or more applicable call forwarding profiles are activated simultaneously
enforce the one or more call forwarding settings corresponding to the at least one call forwarding rule upon activation of the one or more applicable call forwarding profiles;
receive an incoming call intended for the user;
use metadata information including a classification of at least one of: a personal call, a business call, and a project related call associated with the incoming call to prioritize the at least one call forwarding rule in one or more of the activated call forwarding profiles;
forward the incoming call applying the at least one call forwarding rule prioritized in the one or more activated call forwarding profiles, wherein at least one of the activated call forwarding profiles are applied to the incoming call based on a pre-defined order; and
forward the incoming call to a fork associated with a next call forwarding rule in the one or more applied call forwarding profiles upon an unanswered attempt associated with a previous call forwarding rule.

19. The device of claim 18, wherein the call forwarding profiles are roamed across end points of an enhanced communication system using a self-subscription presence model.

20. The device of claim 18, wherein the application is further configured to:
switch automatically from the one or more activated call forwarding profiles to one or more other call forwarding profiles in response to a change in the current state of the user.

* * * * *